(12) United States Patent
Sahashi (10) Patent No.: US 11,938,759 B2
(45) Date of Patent: Mar. 26, 2024

(54) COMPETITION WHEELCHAIR TIRE (71) Applicant: BRIDGESTONE CORPORATION, Tokyo (JP)

(72) Inventor: Kohei Sahashi, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 265 days.

(21) Appl. No.: 17/594,672

(22) PCT Filed: Dec. 10, 2019

(86) PCT No.: PCT/JP2019/048341
§ 371 (c)(1),
(2) Date: Oct. 26, 2021

(87) PCT Pub. No.: WO2020/217581
PCT Pub. Date: Oct. 29, 2020

(65) Prior Publication Data
US 2022/0203772 A1 Jun. 30, 2022

(30) Foreign Application Priority Data
Apr. 26, 2019 (JP) .................. 2019-086622

(51) Int. Cl.
*B60C 11/01* (2006.01)
*B60C 11/12* (2006.01)
(52) U.S. Cl.
CPC .............. *B60C 11/01* (2013.01); *B60C 11/12* (2013.01)

(58) Field of Classification Search
CPC ...... B60C 11/12; B60C 11/01; B60C 2200/00
See application file for complete search history.

(56) References Cited

U.S. PATENT DOCUMENTS

| 2,104,532 | A | * | 1/1938 | Sommer | ............ B60C 11/0311 |
| | | | | | 152/DIG. 3 |
| 7,156,407 | B2 | | 1/2007 | Jahn | |
| 2002/0125678 | A1 | | 9/2002 | Jahn | |
| 2008/0230161 | A1 | * | 9/2008 | Ishiyama | ................ B60C 11/13 |
| | | | | | 152/209.11 |

FOREIGN PATENT DOCUMENTS

| CN | 105015277 A | 11/2015 |
| CN | 109334353 A | 2/2019 |
| CN | 209305249 U | 8/2019 |

(Continued)

OTHER PUBLICATIONS

Huang, English Machine Translation of CN 109334353, 2019 (Year: 2019).*

(Continued)

*Primary Examiner* — Justin R Fischer
*Assistant Examiner* — Brendon Charles Darby
(74) *Attorney, Agent, or Firm* — KENJA IP LAW PC (57) ABSTRACT

A tire includes a sipe, on a surface of a tread of a tire, extending across a tire equator from one side to another side of the tire equator. An end of the sipe on at least the one side is located at a tread edge or near the tread edge, and an inclination angle of the sipe relative to a width direction of the tread decreases from the tire equator towards the tread edge.

6 Claims, 6 Drawing Sheets

(56) References Cited

FOREIGN PATENT DOCUMENTS

JP         2003341307 A      12/2003

OTHER PUBLICATIONS

Nov. 21, 2022, search result of the Extended European Search Report issued by the European Patent Office in the corresponding European Patent Application No. 19926492.0.
Mar. 17, 2020, International Search Report issued in the International Patent Application No. PCT/JP2019/048341.
Dec. 20, 2022, search result of Office Action issued by the China National Intellectual Property Administration in the corresponding Chinese Patent Application No. 201980095771.4.
Sep. 28, 2021, International Preliminary Report on Patentability issued in the International Patent Application No. PCT/JP2019/048341.

* cited by examiner

COMPETITION WHEELCHAIR TIRE

TECHNICAL FIELD

The present disclosure relates to a tire for wheelchairs used in various competitions, and in particular proposes a competition wheelchair tire provided with grip for the hand of a user seated in the wheelchair and with drainage performance.

BACKGROUND

In self-propelled wheelchairs in which the wheelchair users control the movement of the tires by themselves, a hand rim coaxial with the tire is provided on the axial outer side of the tire on both sides of the chair portion, and users rotate the hand rims by hand to propel the wheelchairs by themselves.

In particular, when playing in a sports competition, such as tennis, while seated in a competition wheelchair, athletes must quickly react and change their behavior as the game unfolds, both quickly changing their own position and making minute adjustments to their position. The athletes therefore need to touch the tires directly with their hands and control the movement of the wheelchair at the appropriate timing for pushing and braking of the wheelchair.

CITATION LIST

Patent Literature
  PTL 1: U.S. Pat. No. 7,156,407 B2

SUMMARY

Technical Problem

Here, if the tire has a raised portion, an athlete's hand may be injured by the edge of the raised portion or the like when the hand directly touches the tire. To prevent the athlete's hand from being injured, the wheelchair tire described in Patent Literature (PTL) 1, for example, is provided with a smooth, even surface in the area where the hand touches.

With a competition wheelchair, however, it is necessary to rotate the tires so that the wheelchair moves from a stopped state to a fast speed when pushing, and to stop the rotation of the tires abruptly when braking. Better grip is thus required between the athlete's hands and the tires. At such times, the wheelchair tire of PTL 1, with no uneven surface properties whatsoever, has insufficient grip for the user's hand.

Furthermore, in the competition wheelchair tire of PTL 1, no consideration is given to drainage performance for draining the tire when a water film is present in the contact patch. For example, a competition wheelchair tire that is used in outdoor sports such as tennis is also used on wet ground or grass courts after it rains. If a water film is present in the contact patch at this time, the water film comes between the tire and the contact patch, preventing the tire from making contact with the ground. This results in slippage, adversely affecting the competition. In order to prevent such tire slippage, the tire needs to have drainage performance to drain water adhered to the tire. In particular, when the contact patch has a water film deep enough for a portion of the tread surface to be immersed, better drainage performance is required.

It is therefore an aim of the present disclosure to provide a competition wheelchair tire with grip for the hand and high drainage performance for a wet contact patch.

Solution to Problem

We carefully studied how to solve the aforementioned problem. Upon studying the contact region with the contact patch of a competition wheelchair tire and the contact region with the hand in detail, we discovered that modifying the surface properties of the contact region with the contact patch together with those of the contact region with the hand can achieve grip for the hand and high drainage performance, thereby completing the present disclosure.

We provide the following.
A competition wheelchair tire including:
  a sipe, on a surface of a tread of a tire, extending across a tire equator from one side to another side of the tire equator,
  wherein an end of the sipe on at least the one side is located at a tread edge or near the tread edge, and an inclination angle of the sipe relative to a width direction of the tread decreases from the tire equator towards the tread edge.

Here, stating that "an inclination angle of the sipe relative to a width direction of the tread decreases from the tire equator towards the tread edge" includes the cases of the inclination angle changing in stages, the inclination angle decreasing gradually, and the inclination angle decreasing gradually in parts.

The "tread edge" is the outer edge in the width direction of the formation region of the tread pattern, which is formed according to the requirements of each wheelchair tire.

Furthermore, unless otherwise stated, the positions and dimensions refer to those in the state of the product tire.

Advantageous Effect

According to the present disclosure, a competition wheelchair tire with grip for the hand and high drainage performance for a wet contact patch can be provided.

BRIEF DESCRIPTION OF THE DRAWINGS

In the accompanying drawings.

DETAILED DESCRIPTION

First Embodiment

Exemplary embodiments of a competition wheelchair tire according to the present disclosure (also referred to below simply as a "tire") are described below in detail with reference to the drawings.

Figure 1A:
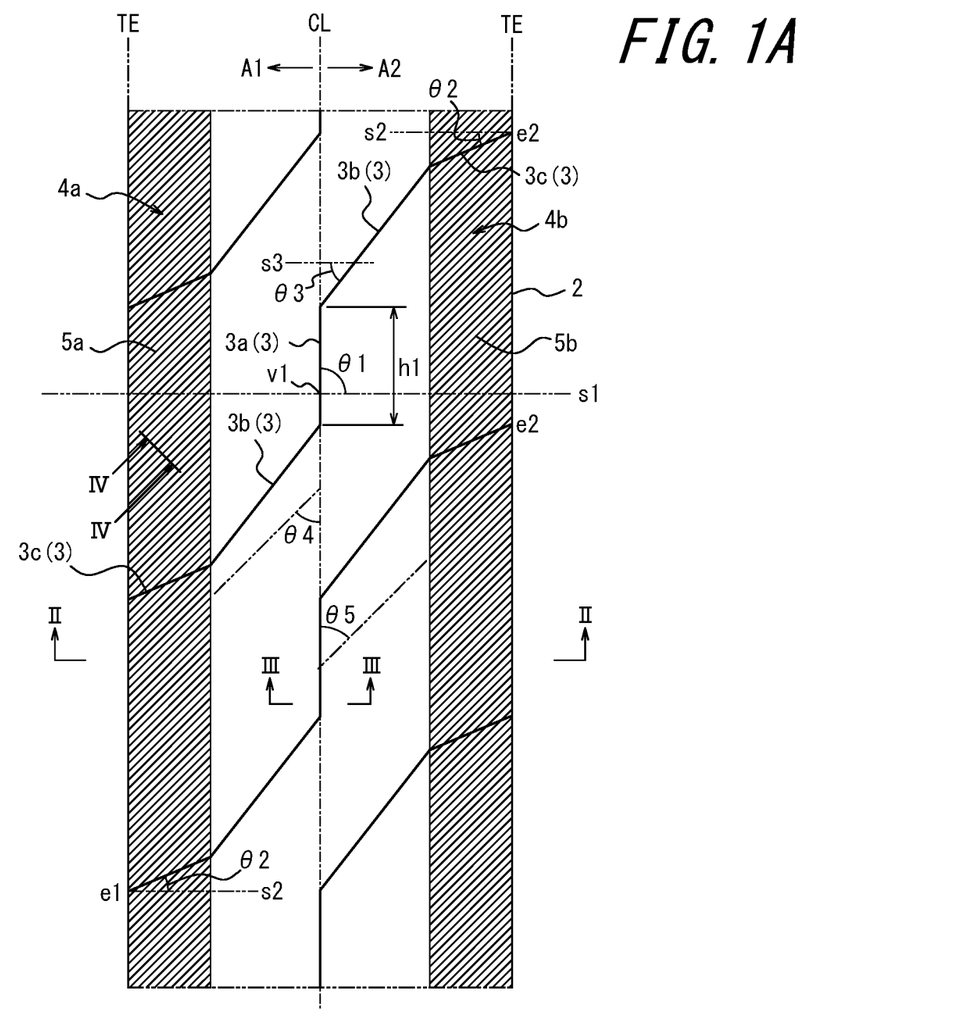
FIG. 1A is a diagram illustrating a portion of a tire according to a first embodiment of the present disclosure, developed in the tread width direction.
Figure 1B:
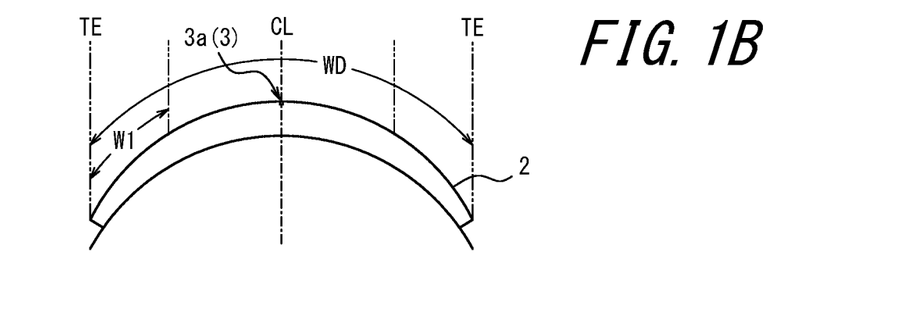
FIG. 1B is a schematic cross-sectional view along line II-II of FIG. 1A.
Figure 2:
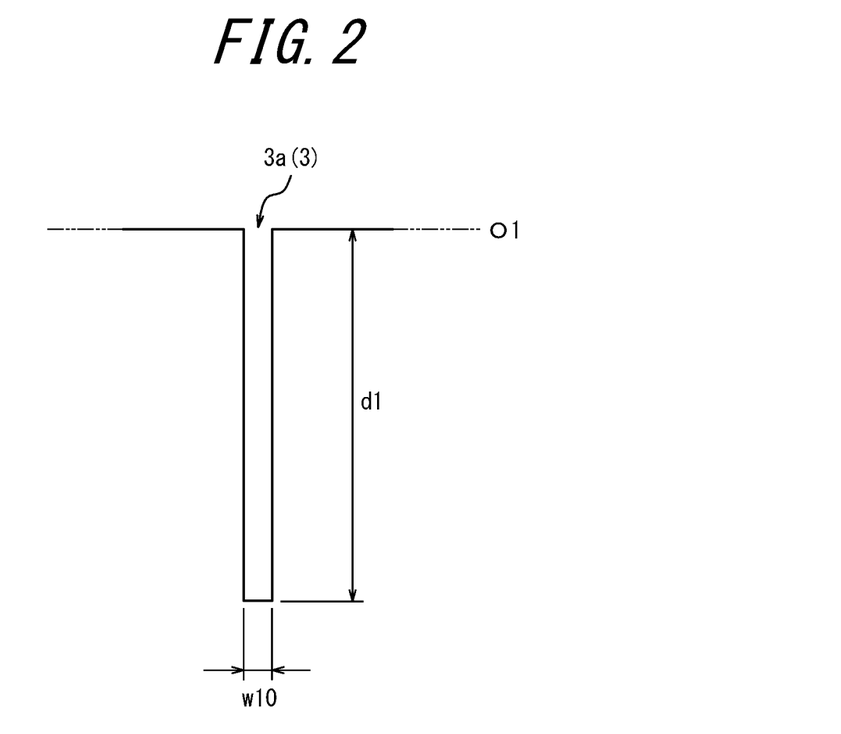
FIG. 2 is a cross-sectional view along line of FIG. 1A.

FIG. 1A is a diagram illustrating a portion of a tread surface 2 of a tire 1 according to a first embodiment of the present disclosure, developed in the tread width direction, and FIG. 1B is a schematic cross-sectional view along line II-II of FIG. 1A. FIG. 2 is a cross-sectional view along line of FIG. 1A. Although the internal structure of the tire 1 is not limited and is omitted from the drawings, from the viewpoint of durability, the tire 1 preferably includes a carcass, as a framework, extending between a pair of bead portions, and a tread on the outer side of the carcass in the tire radial direction.

The tire 1 includes sipes 3, on the tread surface 2, extending across the tire equator CL from a region A1 on one side to a region A2 on the other side of the tire equator CL. In at least one side divided by the tire equator CL, in the regions A1, A2 on both sides in the illustrated example, ends e1, e2 of the sipe 3 extend to the tread edge TE, and an inclination angle of the sipe 3 relative to the width direction of the tread decreases from the tire equator CL towards the tread edge TE. In FIG. 1, the sipe 3 is formed by a partial sipe 3a extending along the tire equator CL, a partial sipe 3b extending in a straight line with a smaller inclination angle relative to the width direction of the tread than the partial sipe 3a, and a partial sipe 3c extending in a straight line to the tread edge TE with a smaller inclination angle relative to the width direction of the tread than the partial sipe 3b.

The competition wheelchair tire is mainly used for forward and backward movements in the front-back direction, particularly in ball games such as tennis. During such movements in the front-back direction, the ground contact pressure distribution tends to increase more on the tire equator CL side than on the tread edge TE side of the tread surface 2. By the sipe 3 being provided in such an area where the ground contact pressure distribution increases, the drainage performance can be improved by taking in and draining the water present between the tire and the contact patch. In particular, by the sipes straddling the tire equator CL, drainage can be promoted from the tire equator CL towards the regions A1, A2 on both sides, thereby achieving high drainage performance even when the contact patch has a water film that is deep enough for a portion of the tread surface to be immersed. Furthermore, the inclination angle of the sipe 3 relative to the tread width direction decreases from the tire equator CL side to the tread edge TE side, i.e., the sipe 3 changes to a direction closer to the tread width direction, thereby promoting drainage from the tire equator CL to the tread edge TE side.

When the athlete directly touches the tire 1 with the hand, the hand mainly touches the region adjacent to the tread edge TE. That is, when the athlete is pushing or braking the competition wheelchair, the athlete touches the region adjacent to the tread edge TE on the side closer to the athlete's body to rotate the tire 1. Furthermore, during movements in the front-back direction, the direction of input of force by the hand is also in the front-back direction. Therefore, as the inclination angle of the sipe 3 relative to a direction that crosses the front-back direction, i.e., the tread width direction, is smaller, the gripping force between the tire 1 and the hand can be increased by the edge component of the sipe. As illustrated in FIG. 2, the sipe 3 has a shape that is recessed from the outline O1 of the tread surface 2, i.e., a shape recessed toward the inner side of the tire from the line along the tread surface 2 when the recessed portion is omitted in a cross-sectional view in the tread width direction. The surface of the hand and fingers is therefore not pushed or strongly contacted by a component protruding from the outline O1 of the tread surface 2. The grip can thus be enhanced without injuring the hands of the athlete.

Since the sipe 3 extends at the greatest inclination angle relative to the tread width direction on the tire equator CL side, the contact patch with the tread surface 2 is not interrupted by the sipe during ground contact, allowing smooth contact with the ground.

Here, the sipe 3 extends from the tread edge TE of the region A1 to the tread edge TE of the region A2 in the illustrated example, but it suffices for the tip in the region A1 on at least one side to be located at or near the tread edge TE. Near the tread edge TE refers here to the region adjacent to the tread edge TE. The tip of the sipe 3 is preferably located at a position 0% to 15% of the length WD along the periphery of the tread surface 2 in the width direction from the tread edge TE. The starting point is more preferably located on the tread edge TE. By the sipe being arranged in an area where the input of force by the athlete's hand is mainly present, the grip for the hand can be improved.

The sipe 3 is not limited to a shape with partial sipes 3a, 3b, 3c whose inclination angle changes stepwise in three stages, but may instead extend in two stages or extend with inclination angle decreasing gradually in parts.

To improve the drainage performance at the tire equator CL, the sipe 3 preferably has an angle θ1 of 70° to 90° between the partial sipe 3a and a line segment s1 along the tread width direction, where an apex v1 is the point where the tire equator CL and the partial sipe 3a intersect.

As illustrated in FIG. 1, the sipe 3 more preferably has a portion extending at an inclination angle of 90° relative to the tread width direction, i.e., along the tire equator CL. In the illustrated example, the partial sipe 3a of the sipe 3 extends along the tire equator CL. By having a portion extending along the tire equator CL, it is easier to take in moisture present in the contact patch along the tire rotation direction, and the drainage performance can be further improved.

A length h1, along the tire equator CL, of the partial sipe 3a extending along the tire equator CL in the sipe 3 is not particularly limited, but the drainage performance can be further improved by the length h1 being 15% to 25% of the total circumferential tread length of the tire equator CL.

To improve the grip for the hand, the sipe 3 preferably has an angle θ2 of 10° to 70° between the partial sipes 3c and a line segment s2 along the tread width direction, with the respective tips e1, e2 on the tread edge TE side as apices.

The angle θ2 is more preferably 0°. That is, the sipe 3 particularly preferably extends in a direction along the tread width direction at the tread edge TE side, and in a variation of the sipe 3 illustrated in FIG. 3, the partial sipes 3c of the sipe 3 are oriented along the tread width direction. By the sipe 3 extending in the tread width direction, which is a direction that resists the input of force along the front-back direction, the grip for the hand in particular can be increased, facilitating control of the tire when pushing and suddenly stopping.

The partial sipe 3b, disposed between the partial sipe 3a and the partial sipe 3c of the sipe 3, preferably has an inclination angle θ3 of 20° to 70° relative to a line segment s3 along the tread width direction.

The position at which the inclination angle of the sipe 3 relative to the tread width direction becomes smallest is preferably located 7.0% to 33.0% of the width direction length WD along the periphery of the tread surface 2 from the tread edge TE. This is because an athlete's hand tends to come into contact with the region on the tread edge TE side more than the aforementioned position. The sipe 3 more preferably extends from the aforementioned position to the tread edge TE.

An opening width w10 of the sipe 3 is preferably between 0.5 mm and 2.0 mm. By the opening width w10 being set to 0.5 mm or more, the drainage performance can be improved while also achieving a sufficient edge effect for the athlete's hands, and by the opening width w10 being set to 2.0 mm or less, the rigidity of the tread surface 2 can be maintained.

A maximum depth d1 of the sipe 3 is preferably between 0.5 mm and 2.0 mm. By the maximum depth d1 of the sipe 3 being set to 0.5 mm or more, the drainage performance can be improved, and by the maximum depth d1 being set to 2.0 mm or less, the rigidity of the tread surface 2 can be maintained.

The sipes 3 are preferably arranged at equal intervals over the entire circumference of the tread surface 2. More preferably, 20 or more sipes 3 are arranged at equal intervals over the entire circumference of the tread surface 2. By the number of sipes 3 being 20 or more, the drainage performance can be further improved while also improving the grip for the hand, and by the number being 160 or less, the rigidity of the tread surface 2 can be maintained.

The tire 1 preferably includes grip areas 4a, 4b in regions A1, A2, divided by the tire equator CL, on both sides of the tread surface 2. In the grip areas 4a, 4b, a plurality of recessed lines 5a, 5b, with a shape recessed toward the inner side of the tire from an outline of the tread surface 2, extend from the tread edge TE side in a direction inclined relative to the tire equator CL and are arrayed in parallel. The shapes of the recessed lines 5a and 5b are described in detail below, using the recessed line 5a as a typical example.

Figure 4A:
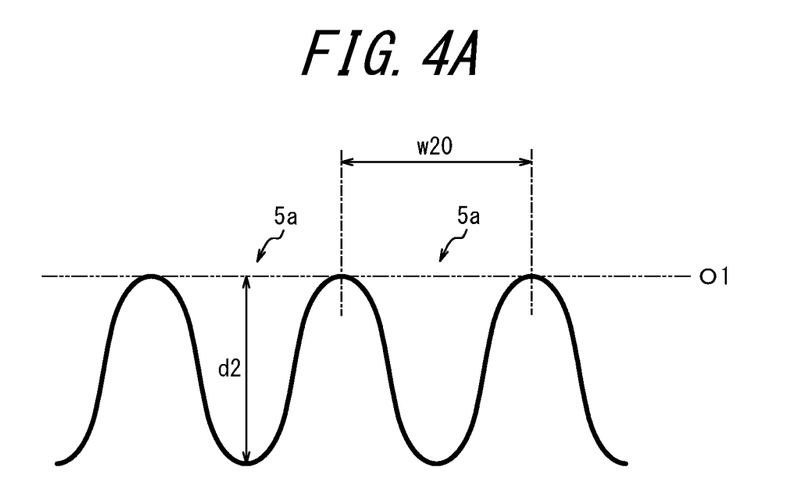
FIG. 4A is a cross-sectional view along line IV-IV of FIG. 1A.

FIG. 4A is a cross-sectional view along line IV-IV of FIG. 1A. As illustrated in FIG. 4A, the recessed line 5a has a shape that is recessed toward the inner side of the tire more than an outline O1 of the tread surface 2, that is, the line along the tread surface 2 when the recessed portion is omitted in a cross-sectional view in the tread width direction. The recessed shape is not particularly limited, but in the illustrated example, the recessed shape is a curved shape recessed from the outline O1, and a plurality of recessed lines 5a are arranged in parallel to yield a waveform.

In FIG. 1A, the recessed lines 5a are illustrated by solid lines to indicate the extended shape.

Figure 4B:
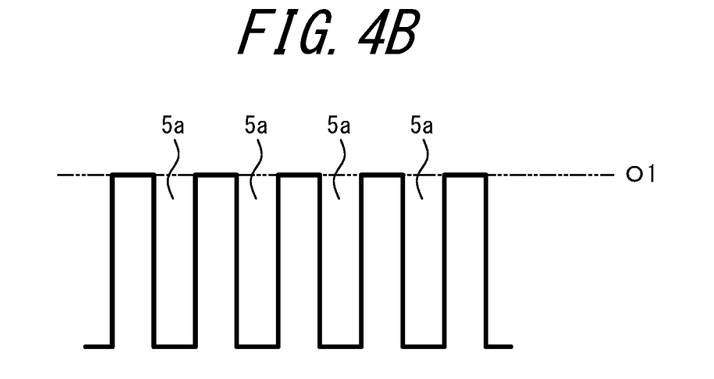
FIG. 4B is a cross-sectional view along line IV-IV of FIG. 1A.

The cross-sectional shape of the recessed lines 5a is not limited to the example illustrated in FIG. 4A, but rather can be appropriately modified. For example, a form with rectangular openings from the outline O1, as illustrated in FIG. 4B, can be adopted.

When an athlete directly touches the grip area 4a of the tire 1 with the hand during pushing, braking, etc. of the competition wheelchair, the plurality of recessed lines 5a arrayed in the grip area 4a come into contact with the hand. When the plurality of recessed lines 5a come into contact with the surface of the hand, friction is generated between the recessed lines 5a and the hand to provide grip. At this time, since the recessed lines 5a have a shape that is recessed from the outline O1 of the tread surface 2, the surface of the hand and fingers is not pushed or strongly contacted by a component protruding from the outline O1 of the tread surface 2. The grip can thus be enhanced without injuring the hands of the athlete.

Here, the recessed lines 5a preferably extend in a direction inclined relative to the tire equator CL. That is, forward and backward movements in the front-back direction are mainly performed, particularly in ball games such as tennis, and the direction of input of force by the hand is also in the front-back direction. Therefore, the formation of the recessed lines 5a in a direction that crosses the front-back direction, i.e., a direction that is inclined relative to the tire equator CL, can achieve gripping force between the tire 1 and the hand.

The inclination angle of the recessed lines 5a relative to the tire equator CL is not particularly limited, but an acute angle θ4 formed between the recessed lines 5a and the tire equator CL is preferably 20° or more. By the acute angle θ4 being 20° or more, a better grip can be achieved for a hand performing movements in the front-back direction. The recessed lines 5a may extend in a direction orthogonal to the tire equator CL.

An acute angle θ5 formed between the recessed lines 5b and the tire equator CL is preferably the same as the acute angle θ4 but may differ. The recessed lines 5b as well may extend in a direction orthogonal to the tire equator CL. Furthermore, the recessed lines 5a, 5b may extend in directions exhibiting line symmetry with respect to the tire equator CL, with the tire equator CL as an axis of symmetry.

The recessed lines 5a preferably start from the tread edge TE side, i.e., from the region adjacent to the tread edge TE. When the athlete directly touches the tire 1 with the hand, the hand mainly touches the region adjacent to the tread edge TE. That is, when the athlete is pushing or braking the competition wheelchair, the athlete touches the region adjacent to the tread edge TE on the side closer to the athlete's body to rotate the tire 1. Therefore, by the recessed lines 5a being arranged in the region adjacent to the tread edge, the grip between the hand and the tread surface 2 can be further improved.

The recessed lines 5a preferably have a starting point at a position between 7.0% and 33.0% of a length WD along the periphery of the tread surface 2 in the width direction from the tread edge TE, and the starting point is more preferably located at the tread edge TE. This is because the region where the input of force by the athlete's hand is particularly strong tends to be located here.

A length W1 in the tread width direction, along the periphery of the tread surface 2, of the grip area 4a in which the recessed lines 5a are arrayed is preferably between 7.0% and 33.0% of the length WD of the tread surface 2 in the width direction. By the ratio W1/WD being set to 7.0% or more, the grip for the athlete's hand can be sufficiently enhanced, and by the ratio W1/WD being set to 33.0% or less, the rigidity of the tread surface 2 can be maintained.

As illustrated in FIG. 1A, the inclination angle of the sipe 3 relative to the tread width direction preferably becomes the smallest inclination angle relative to the tread width direction at the edge of the grip area 4a on the tire equator CL side. As described above, the grip area 4a is located in the region mainly contacted by the athlete's hand, and the existence of a portion having the smallest inclination angle relative to the tread width direction in such a region can efficiently improve the grip between the tread surface 2 and the hand.

Furthermore, it is essential for the tire 1 to include the grip area 4a, in which the recessed lines 5a are arrayed, along the entire circumference of the tread surface 2, so that a good grip can be obtained regardless of which part, in the tire circumferential direction, of the rolling tire is contacted by the athlete's hand.

The depth d2 of the recessed lines 5a is not particularly limited but is preferably between 0.5 mm and 2.0 mm. By the depth d2 being set to 0.5 mm or more, the grip for the hand can be sufficiently enhanced, and by the depth d2 being set to 2.0 mm or less, the rigidity of the tread surface 2 can be maintained.

Furthermore, an opening width w20 of the recessed lines 5a is not particularly limited but is preferably between 0.5 mm and 2.0 mm. Here, the opening width w20 of the recessed lines 5a refers to the opening length orthogonal to the extending direction of the recessed lines 5a on the outline O1. By the opening width w20 being set to 0.5 mm or more, the grip for the hand can be further improved, and by the opening width w20 being set to 2.0 mm or less, the rigidity of the tread surface 2 can be maintained, while also preventing foreign matter such as sand from entering the recessed lines 5a and damaging the inside of the recessed lines 5a or injuring the hands of the athlete.

The interval between recessed lines 5a is preferably between 0 mm and 3.0 mm. The interval refers to the shortest distance between adjacent recessed lines 5a. In the example illustrated in FIG. 4A, the recessed lines 5a are arranged without spacing, i.e., with an interval of 0 mm. When the sidewalls of the recessed lines 5a extend along the tire radial direction, as illustrated in FIG. 4B, the recessed lines 5a are preferably arranged with a spacing of 0.5 to 3.0 mm to prevent adjacent recessed lines 3a from integrating, while providing sufficient grip for the hand.

By the grip areas 4a, 4b being arranged in respective regions A1, A2 on both sides, divided by the tire equator CL, the grip of the tire 1 for the hand can be enhanced regardless of the mounting direction of the tire. That is, as described above, when the athlete is pushing or braking the competition wheelchair, the athlete touches the region adjacent to the tread edge TE on the side closer to the athlete's body to rotate the tire 1. The side closer to the athlete's body is determined by the mounting direction of the tire, but grip for the hand can be provided regardless of the direction in which the tire is mounted. In general, a competition wheelchair tire is mounted with a negative camber to facilitate turning motions. With this type of mounting, one of the regions A1, A2 is mainly in contact with the contact patch, and wear tends to occur in the region on the side in contact with the contact patch. After wear has progressed in one of the regions A1, A2, the tire 1 is often remounted in the opposite mounting direction. Therefore, by the grip areas 4a or 4b being provided in both regions A1, A2, grip can be provided both before and after remounting.

Furthermore, in FIG. 1A, the grip area 4a has an array of recessed lines, inclined in a single direction relative to the tire equator CL, over the entire circumference of the tire, but a plurality of recessed lines inclined in different directions may be arranged simultaneously, in a grid, over a portion or the entire circumference of the tire. That is, in FIG. 3, grip areas 40a, 40b are disposed respectively in the regions A1, A2, and in the grip area 40a, recessed lines 50a, 50b extend in a plurality of directions and intersect to form a grid-like pattern on the tread surface 2. In the grip area 40b, recessed lines 50c, 50d similarly form a grid-like pattern. According to the above configuration, the recessed lines can be arranged at a higher density than when the recessed lines are inclined in a single direction with respect to the tire equator CL. The grip for the hand can thereby be further improved.

Figure 3:
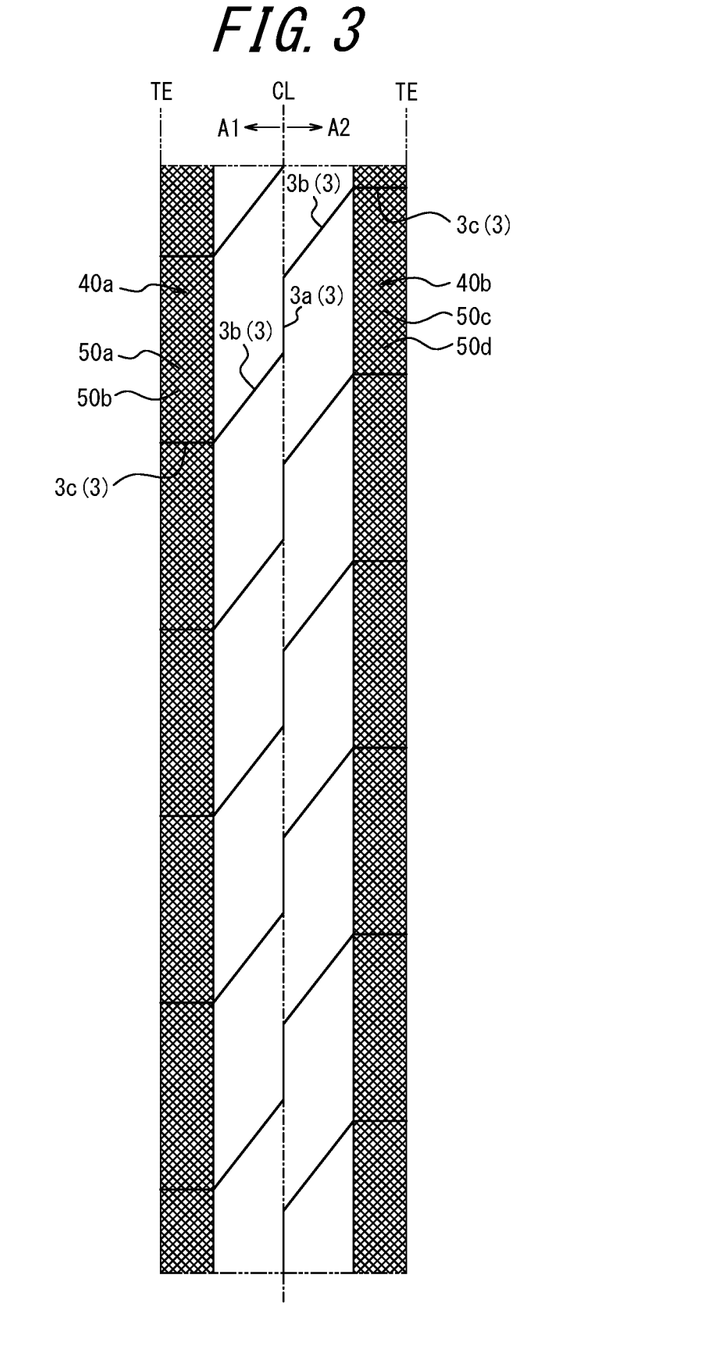
FIG. 3 illustrates a modification to the sipes and the recessed lines.
Figure 5A:
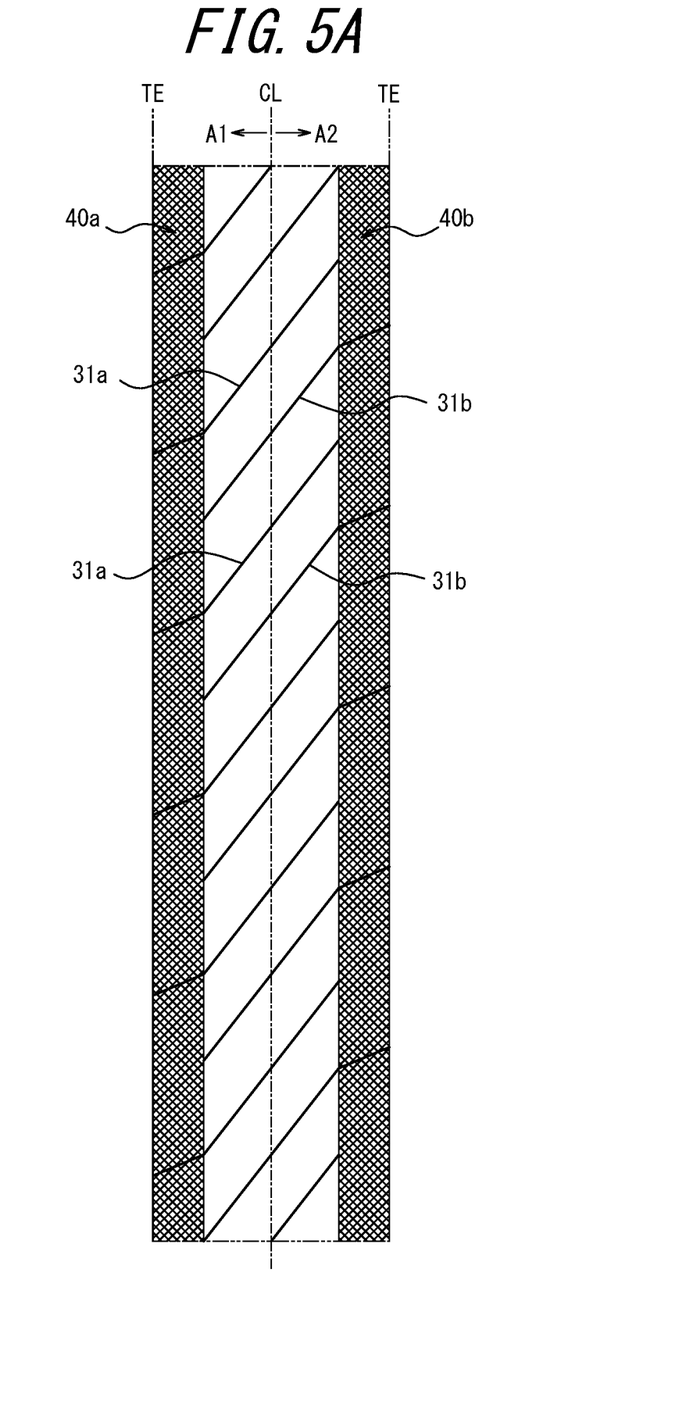
FIG. 5A illustrates a variation of the sipes and the recessed lines.
Figure 5B:
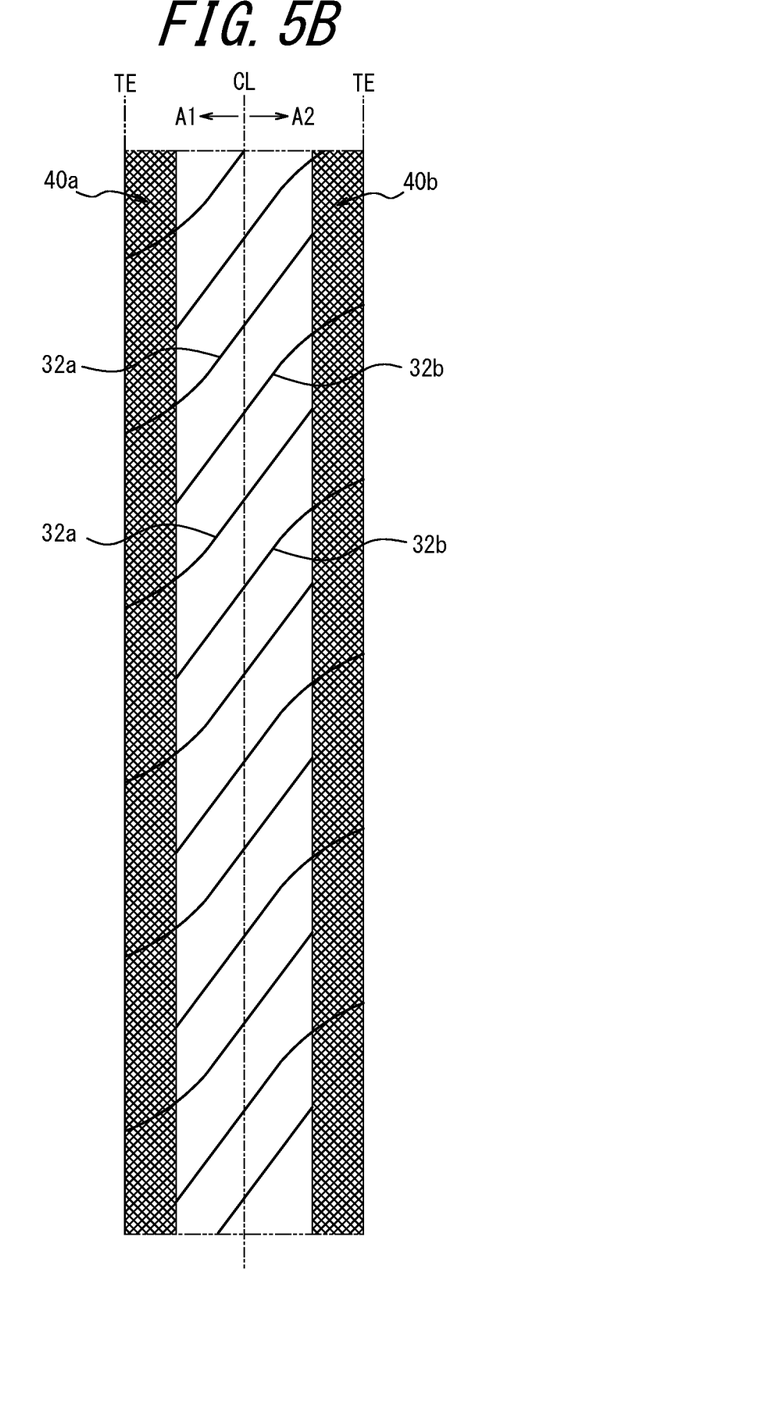
FIG. 5B illustrates a variation of the sipes and the recessed lines.

The shape of the sipes is not limited to the examples illustrated in FIGS. 1A and 3 but can be appropriately modified, such as to the forms illustrated in FIGS. 5A and 5B. The same constituent elements as in FIGS. 1A and 3 are denoted by the same reference symbols.

In FIG. 5A, a sipe 31a extends in the grip area 40a with a smaller inclination angle relative to the tread width direction than on the tire equator CL side, and a sipe 31b extends in the grip area 40b at a smaller inclination angle relative to the tread width direction than on the tire equator CL side.

In FIG. 5B, a sipe 32a curves and extends from near the grip area 40a with a smaller inclination angle relative to the tread width direction than on the tire equator CL side, and a sipe 32b curves and extends in the grip area 40b with a smaller inclination angle relative to the tread width direction than on the tire equator CL side.

REFERENCE SIGNS LIST

1 Tire
2, 20 Tread surface
3, 31a, 31b, 32a, 32b Sipe
3a, 3b, 3c Partial sipe
4a, 4b, 40a, 40b Grip area
5a, 5b, 50a, 50b, 50c, 50d Recessed line
CL Tire equator
TE Tread edge
A1, A2 Region
O1 Outline
s1, s2, s3 Line segment
e1, e2 End

The invention claimed is:

1. A competition wheelchair tire comprising:
    a sipe, on a surface of a tread of a tire, extending across a tire equator from one side to another side of the tire equator; and
    a grip area along an entire circumference of the tire, in each of regions on the one side and the another side, the grip area including a plurality of recessed lines, with a shape recessed toward an inner side of the tire from an outline of the surface of the tread, that extend from the tread edge side in a direction inclined relative to the tire equator and are arrayed in parallel,
    wherein an end of the sipe on at least the one side is located at a tread edge or near the tread edge, and an inclination angle of the sipe relative to a width direction of the tread decreases from the tire equator towards the tread edge,
    the inclination angle of the sipe relative to the width direction of the tread in the grip area is smaller than the inclination angle of the sipe relative to the width direction of the tread in an area inside the width direction of the tread compared to the grip area, and
    the sipe includes a partial sipe portion extending along the tire equator.

2. The competition wheelchair tire of claim 1, wherein the sipe extends along the width direction of the tread at the tread edge side.

3. The competition wheelchair tire of claim 1, wherein the grip area includes an array of intersecting recessed lines extending in a plurality of directions relative to the tire equator.

4. The competition wheelchair tire of claim 1, wherein the sipe has an opening width between 0.5 mm and 2.0 mm.

5. The competition wheelchair tire of claim 1, wherein the sipe has a maximum depth between 0.5 mm and 2.0 mm.

6. The competition wheelchair tire of claim 1, wherein the partial sipe portion has a length being 15% to 25% of a total circumferential tread length of the tire equator.

* * * * *